(12) United States Patent
Elliott

(10) Patent No.: US 6,507,450 B1
(45) Date of Patent: Jan. 14, 2003

(54) METHOD OF CONTINUOUSLY RECORDING SERVO BURSTS ALONG ONE CONTINUOUS, SINGLE HELIX SPIRAL

(75) Inventor: Timothy J. Elliott, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/330,756

(22) Filed: Jun. 11, 1999

(51) Int. Cl.$^7$ ............................................... G11B 5/596
(52) U.S. Cl. ................................................... 360/77.08
(58) Field of Search ........................... 360/77.08, 77.07, 360/75, 78.04, 77.02, 77.11

(56) References Cited

U.S. PATENT DOCUMENTS

| | | | |
|---|---|---|---|
| 4,636,885 A | | 1/1987 | Yamada et al. |
| 4,737,869 A | | 4/1988 | Sugaya et al. |
| 4,912,576 A | * | 3/1990 | Janz .......................... 360/77.07 |
| 5,119,248 A | | 6/1992 | Bizjak et al. |
| 5,583,712 A | * | 12/1996 | Brunelle .................... 360/77.07 |
| 5,619,387 A | | 4/1997 | Ottesen et al. |
| 6,091,564 A | * | 7/2000 | Codilian et al. ............... 360/75 |

* cited by examiner

Primary Examiner—David Hudspeth
Assistant Examiner—Mitchell Slavitt
(74) Attorney, Agent, or Firm—Milad G. Shara, Esq.; Myers, Dawes & Andras

(57) ABSTRACT

An efficient, time saving, cost-effective method of using a servo track writer (STW) for continuously recording servo information along one, continuous, single helix spiral path on the surface of a magnetic disk in a disk drive. The write transducer is guided along the single-helix spiral path by moving the write transducer at a constant radial velocity while the disk is rotating. The STW moves the write transducer less than a head's width per revolution such that the strokes of each spiral revolution overlaps the stroke of a prior spiral revolution. The resulting servo track centerlines are formed as spiral servo segments that are written quickly and relatively smoothly, but are separate or disjointed from one another. A disk drive incorporating such uniquely written servo information uses suitable offset information as a function of servo wedge number so that the drive may track follow any one of a plurality of circular data tracks or one long spiral data track.

28 Claims, 11 Drawing Sheets

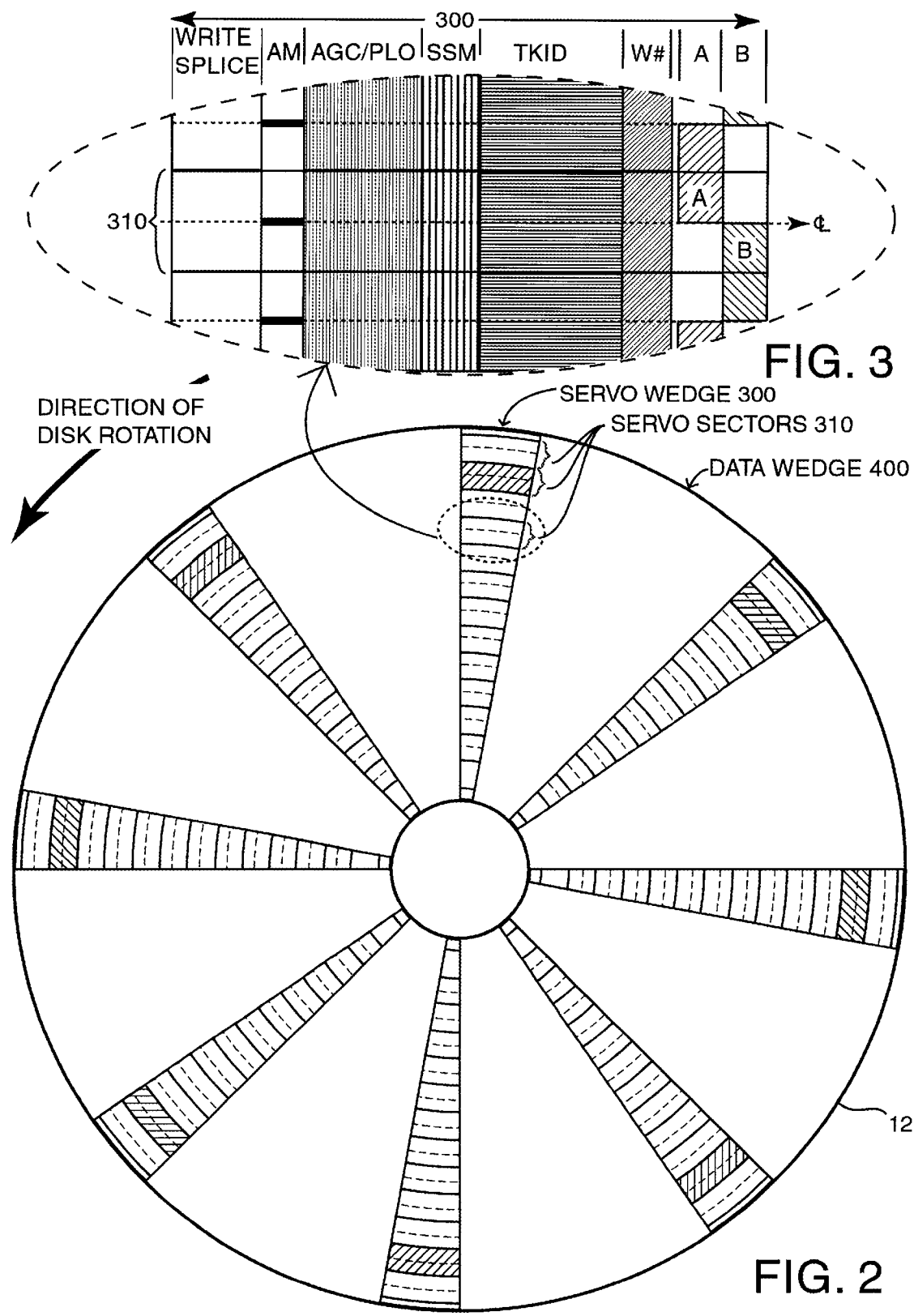

AFTER PASS #1

AFTER PASS #2

AFTER PASS #3

AFTER PASS #4

AFTER PASS #5

RESULTING BURST PAIR CENTERLINES

FIG. 7 CIRCULAR DATA TRACKS AND SPIRAL CENTERLINE SEGMENTS

ONE SPIRAL DATA TRACK AND SPIRAL CENTERLINE SEGMENTS

METHOD OF CONTINUOUSLY RECORDING SERVO BURSTS ALONG ONE CONTINUOUS, SINGLE HELIX SPIRAL

BACKGROUND OF THE INVENTION

1. Field of the Invention

The present invention relates generally to magnetic disk drives (disk drives), and more particularly to an efficient method of using a servo track writer (STW) for continuously recording servo information along one, continuous, single helix spiral.

2. Description of the Related Art

A conventional disk drive has a head disk assembly (HDA) including at a least one disk, a spindle motor for rapidly rotating the disk, and a head stack assembly (HSA) that includes an actuator assembly and a head gimbal assembly (HGA) with a transducer head for reading and writing data. The HSA is part of a servo control system that positions the transducer head over a particular track on the disk to read or write information from that track. The HSA earns its name from the fact that it generally includes a plurality of HGAs that collectively provide a vertical stack of heads called a "head stack."

The industry presently prefers a "rotary" or "swing-type" actuator assembly that conventionally comprises an actuator body which rotates on a pivot assembly between limited positions, a coil that extends from one side of the actuator body to interact with a pair of permanent magnets to form a voice coil motor (VCM), and an actuator arm that extends from the opposite side of the actuator body to support the HGA.

A disk drive is ultimately used to store user data in one or more "data tracks" on the surface of its disks. Such data tracks are most commonly arranged as a plurality of concentric data tracks, but some disk drives have had a spiral data track as shown, for example, in U.S. Pat. Nos. 4,636,885; 5,583,712; and 5,619,387. In either case, special servo information is recorded on at least one disk surface so that the disk drive's servo control system may control the actuator, via the VCM, to accurately position the transducer head to read or write user data to or from the data tracks. In colloquial terms, the servo information provides the servo control system with the "your head is here" data it needs to attain and then maintain a desired head position. In operation, the disk drive's servo control system intermittently or continuously processes (read only) the pre-recorded servo information just before or while the disk drive processes (reads or writes) user data in the data tracks.

The servo information is factory recorded at the time of manufacture using an expensive and low-throughput manufacturing fixture called a servo track writer (STW). The STW records the servo information in special "servo tracks" on each surface of each disk, or on one dedicated disk, for later use by the servo control system when the drive is in the hands of the user. The servo tracks are generally used throughout the life of the disk drive without modification.

Earlier disk early drives used a "dedicated servo" system where one head and one disk surface provide the servo information for all of the other heads and disk surfaces. As shown in FIG. 2, however, the industry presently prefers an "embedded servo" system wherein the servo information is interspersed amongst the data on each surface of each disk. The servo information is contained in servo wedges 300 that are each divided into a plurality of servo sectors 310. The servo sectors 310 are recorded concentrically in order to provide numerous concentric servo tracks (one entire rotation of servo sectors 310). The servo wedges 300 precede a corresponding number of data wedges 400 that are ultimately used to record concentric data tracks 10 that are divided into a plurality of data sectors (not shown). Each data wedge 400 may contain a whole or fractional part of one or more data sectors (not shown). Because the servo information is provided in servo sectors 310, an embedded servo system is sometimes called a "sector servo" system.

In recording the embedded servo information, the STW takes temporary control of the drive's write operation, repeatedly locates the write transducer to a desired radial position, and then writes, erases, or does nothing (remains idle) at specific angular positions between the head and a reference position of the disk as the disk rotates beneath the write transducer. In order to precisely locate the head where needed, a conventional HDA has first and second access ports (later covered with adhesive labels) for allowing the STW to "reach in" and temporarily control the radial position of the actuator and measure the angular position of the disk while recording the servo information. As to the radial position of the actuator, the conventional STW inserts a moveable "push pin" into the first port, commands the HDA's VCM to bias the actuator against the push pin, moves the push pin against the bias to move the actuator and the attached headstack, and measures the position of the push pin with a laser interferometer to control the radial position of the write transducer carried by the pin-guided actuator. As to the angular position of the write transducer relative to an index position of the disk, the conventional STW inserts a stationary "clock head" into the second port, records a "clock track" containing thousands of "clock marks" and one "index mark" (e.g. an extra clock mark or a gap) on a disk surface of one of the disks, and measures the angular position of the write transducer relative to the index mark by detecting the index mark and thereafter tracking (i.e. counting) the intermediate clock marks.

The conventional STW puts an embedded servo pattern onto a disk by recording concentric servo tracks in a plurality of discrete concentric "passes." Each pass consists of moving the push-pin to "step" the headstack to a desired radial position, allowing the head to "settle," and during one ensuing revolution of the disk, writing new servo information, erasing overlapping portions of previously written servo information, or remaining idle (neither writing nor erasing). On the first pass, the STW moves the write transducer to an outer diameter of the disk, and then records magnetic transitions at discrete angular intervals to record the servo information including track identification (track ID) data and servo bursts. During the second and each of the thousands of subsequent passes, the STW steps the write transducer inward by a fraction of a data track pitch (e.g. ½), waits for the write transducer to settle (as much as one full revolution), and then records the servo information during another full revolution, writing more magnetic transitions, trimming overlapping portions of previously recorded transitions, or holding idle, as appropriate for the desired servo pattern. In order to record concentric servo tracks, therefore, the STW must repeatedly step, wait, and record.

The conventional method of recording concentric servo tracks creates a manufacturing bottleneck because each HDA must remain in the STW for an extensive amount of time in order to step, wait, and record each pass that collectively make up the required servo information. It takes a relatively long time to make thousands of passes of step, wait, and record. For example, given a disk drive that has a spindle motor that rotates at 4,500 RPM, an actuator with an effective stroke (ES) of one inch, and an intended data track density of 8,000 tracks per inch (TPI), and further assuming that the STW steps the write transducer by ½ a data track pitch per pass, it would take 3.56 minutes to record the servo information, i.e.:

$$\frac{8,000\ TPI * 1\ ES}{1/2\ TP * 4500\ RPM} = 3.56\ \text{minutes}$$

The 3.56 minutes assumes 100% STW efficiency. In reality, however, there are other overhead times associated with recording the servo information. As noted above, the write transducer must be stepped after ending one pass and before starting another. The pass to pass "seek and settle" time, or time lag before the write transducer is ready to start a new pass, is one of the more costly overhead times associated with writing concentric servo tracks. In the above-referenced disk drive, for example, the cumulative effect of a seek and settle latency of one revolution per pass would add another full 3.56 minutes to the time it takes to record the servo information on one disk surface. Assuming that the overhead time related to pre-servowrite procedures like drive load, drive spin-up, clock closure, and find edge (push pin/actuator closure and move to start position) and post-servowrite procedures like spin-down and drive unload combine to 0.88 minutes (53 sec.), the total time required to "bank write" or "gang-record" the servo information on all disk services, is as follows:

3.56 min.+3.56 min.+0.88 min.=8.00 minutes

Significantly, the seek and settle latency between steps comprises a large portion of the STW time. In the above disk drive, for example, by just eliminating the seek and settle latency we would reduce the STW cycle time by 44.5%:

$$\frac{3.56\ \text{min}}{8.00\ \text{min}} = 44.5\%$$

Perhaps a spiral servo track would work. Others have disclosed the use of a spiral servo track instead of concentric servo tracks as shown, for example, in the '885 and '712 patents. The latter patent, in fact, suggests using a spiral servo track (called a "servo spiral") to track follow along a circular data track (see FIG. 4A). The 855 and '712 patents, however, do not teach or suggest any particular method of actually recording the spiral servo track while the drive is in the STW.

The disk drive market is extremely competitive and drive makers are continually striving for efficiencies in order to remain profitable. STW's are very expensive devices (upward of $100,000) and it takes a long time to servowrite each disk drive (several minutes per drive). Achieving efficiencies in the servowriting process, therefore, may significantly reduce the overall cost of manufacturing disk drives. Consequently, there remains a need for a method of recording servo information which eliminates the seek and settle times associated with the prior art method of recording concentric servo tracks, and thereby minimizes the required STW time for each drive.

SUMMARY OF INVENTION

In a first aspect, the invention may be regarded as a method of continuously recording servo information on a magnetic disk with a write transducer that is guided by a servo track writer, the method comprising the steps of: defining a continuous spiral path; continuously guiding the write transducer over the magnetic disk to follow the continuous spiral path and while the write transducer is being guided along the continuous spiral path: recording a first plurality of radially partial servo data portions on the magnetic disk during a first complete revolution of the magnetic disk; and recording a second plurality of radially partial servo data portions during a second complete revolution on the magnetic disk to form at least part of a plurality of radially complete servo data sectors. In a preferred embodiment, the write transducer is guided along a continuous spiral path having a radial pitch that is less than a width of the write transducer and the second plurality of radially partial servo data portions overlap the first plurality of radially partial servo data portions.

In a second aspect, the invention may be regarded as a method of continuously recording servo information within a servo sector on a magnetic disk with a write transducer that is guided by a servo track writer, the method comprising the steps of: moving the write transducer over the magnetic disk along one continuous, single-helix spiral stroke; and recording the servo information in the servo sector while the write transducer is moving along the one continuous, single-helix spiral path.

In a third aspect, the invention may be regarded as a method of using a servo track writer to move a write transducer and record servo information on a magnetic disk, the method comprising the steps of: rotating the magnetic disk; moving the write transducer in a radial direction at a constant radial velocity to traverse a spiral path relative to the rotating magnetic disk; and recording servo information on the magnetic disk within a spiral stroke while the write transducer is moving along the spiral path and with a stroke width substantially equal to one width of the write transducer, the constant radial velocity being less than one width of the write transducer per revolution of the rotating magnetic disk such that each revolution of the spiral stroke is overlapped by a subsequent revolution of the spiral stroke.

BRIEF DESCRIPTION OF THE DRAWINGS

The just summarized invention may best be understood with reference to the Figures of which:

FIG. 2 is a top plan view of a disk containing embedded servo information that is recorded within concentric servo tracks that are each defined by a corresponding plurality of concentric servo sectors;

FIG. 3 is a close-up view of the servo information contained in a typical servo sector;

FIGS. 5-1 to 5-5 shows servo information recorded onto a disk along a first through fifth revolutions of the single-helix spiral;

DETAILED DESCRIPTION OF THE PREFERRED EMBODIMENTS

Figure 1:
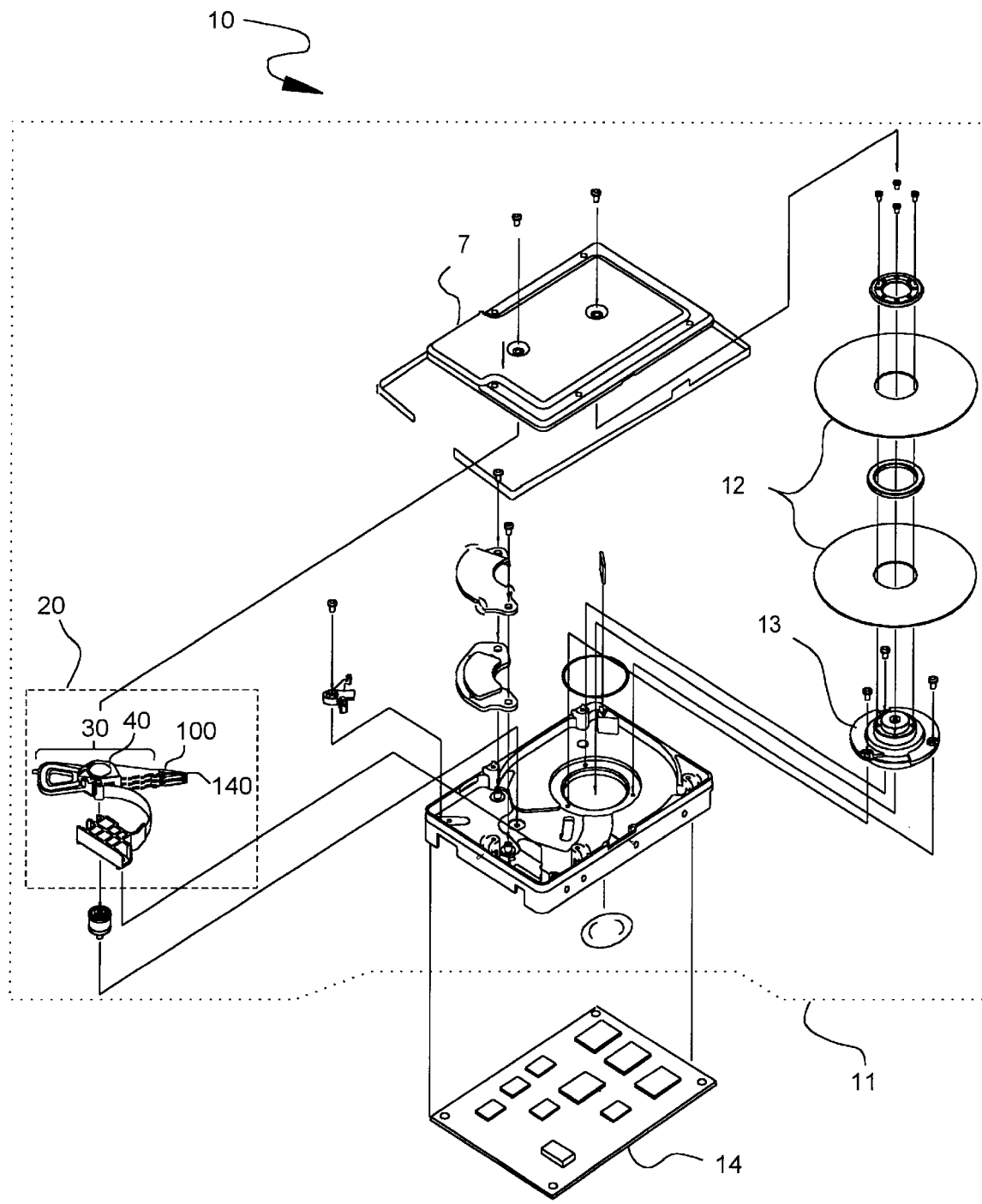
FIG. 1 is an exploded perspective view of a magnetic disk drive 10 having a head disk assembly 11 ("HDA") including a head stack assembly 20 ("HSA") which carries a transducer 140 over concentric data tracks and associated servo bursts on the surface of a disk 12.

This patent application is directed to a new, innovative method of using a servo track writer (STW) to record a spiral servo track and to a disk drive containing the innovative servo pattern that results from such method.

Although it is not necessarily prior art to this invention, the present inventor understands that the STW might be used to record a spiral servo track using a "multi-helix" spiral with at least one helix for each required burst in the desired pattern of servo bursts. For example, in a hypothetical drive having only A and B bursts that are 100% of a data track wide but are written with an 80% write transducer, the STW process would require a four-helix spiral. The two "A" spirals stitch together the 100% A bursts and the two "B" spirals stitch together the "B" bursts. In other words, the STW would:

(1) position the head at the outside diameter (OD), wait for at an angular starting point and then record the first "A" helix (from OD to ID);

(2) return the head to the OD, move the head radially inward; wait for the same angular starting point, and then record the second "A" helix (from OD to ID);

(3) return the head to the OD, move the head radially inward, wait for the same angular starting point, and record the first "B" helix (from OD to ID); and (4) return the head to the OD, move the head radially inward, wait for the same angular starting point, and record the second "B" helix (from OD to ID).

Unfortunately, this multi-helix approach would require extremely accurate positioning by the STW and target HDA mechanics.

According to this invention, however, the STW may record the servo information in overlapping "strokes" or "swaths" while continuously traversing the write transducer along one, single, spiral servowriting "path." As used herein, a "path" is a thin line of travel having no dimension whereas a "stroke" or "swath" is the thick region having of width that is affected by such travel. The path may more particularly be regarded as an infinitely thin, spiral line that is traversed by a reference point associated with write transducer. The reference point may be any analytically convenient point such as an outer edge of the head or its physical centerline. In this disclosure, we use the write transducer's outer edge as the reference point because that is the boundary at which prior servo information is "stitched" or "trimmed" and also the boundary at which burst pair centerlines are formed. The stroke or swath, on the other hand, may be regarded as a spiral region of a certain width or thickness that is traversed by the entire write transducer and thereby "painted" with magnetic transitions as the write transducer's reference point travels along the spiral path. The thickness of the spiral stroke, therefore, corresponds to the width of the write transducer.

This invention advantageously permits the STW to continuously record all of the servo information required for one disk surface in one long spiral pass, i.e. with a single-start, single-helix spiral. The invention enables the STW to use a single-start, single-helix path by moving the actuator at a sufficiently slow rate, relative to the rotational speed of the disk (RPMs) and the width of the write transducer, so that each new full-revolution spiral stroke overlaps a prior, full-revolution spiral stroke, the edge of the overlap defining a single, spiral, burst pair centerline.

FIG. 1 shows the principal components of a disk drive 10 that operates with servo information written according to this invention. The disk drive 10 shown is an integrated drive electronics (IDE) drive, comprising a head disk assembly (HDA) 11 and a controller circuit board 14.

The HDA 11 of FIG. 1 comprises a magnetic disk 12 (2 shown), a spindle motor 13 for rapidly rotating the disk 12, and a head stack assembly (HSA) 20 located next to the disk 12. The HSA 20 shown comprises a swing-type actuator assembly 30 that has at least one head gimbal assembly (HGA) 100 which carries a read/write transducer 140. The preferred read/write transducer 140 is a magnetoresistive head (MR head) that has an inductive write transducer and a separate, magnetoresistive (MR) read transducer, but other head technologies may be used.

Figures 1, 5:
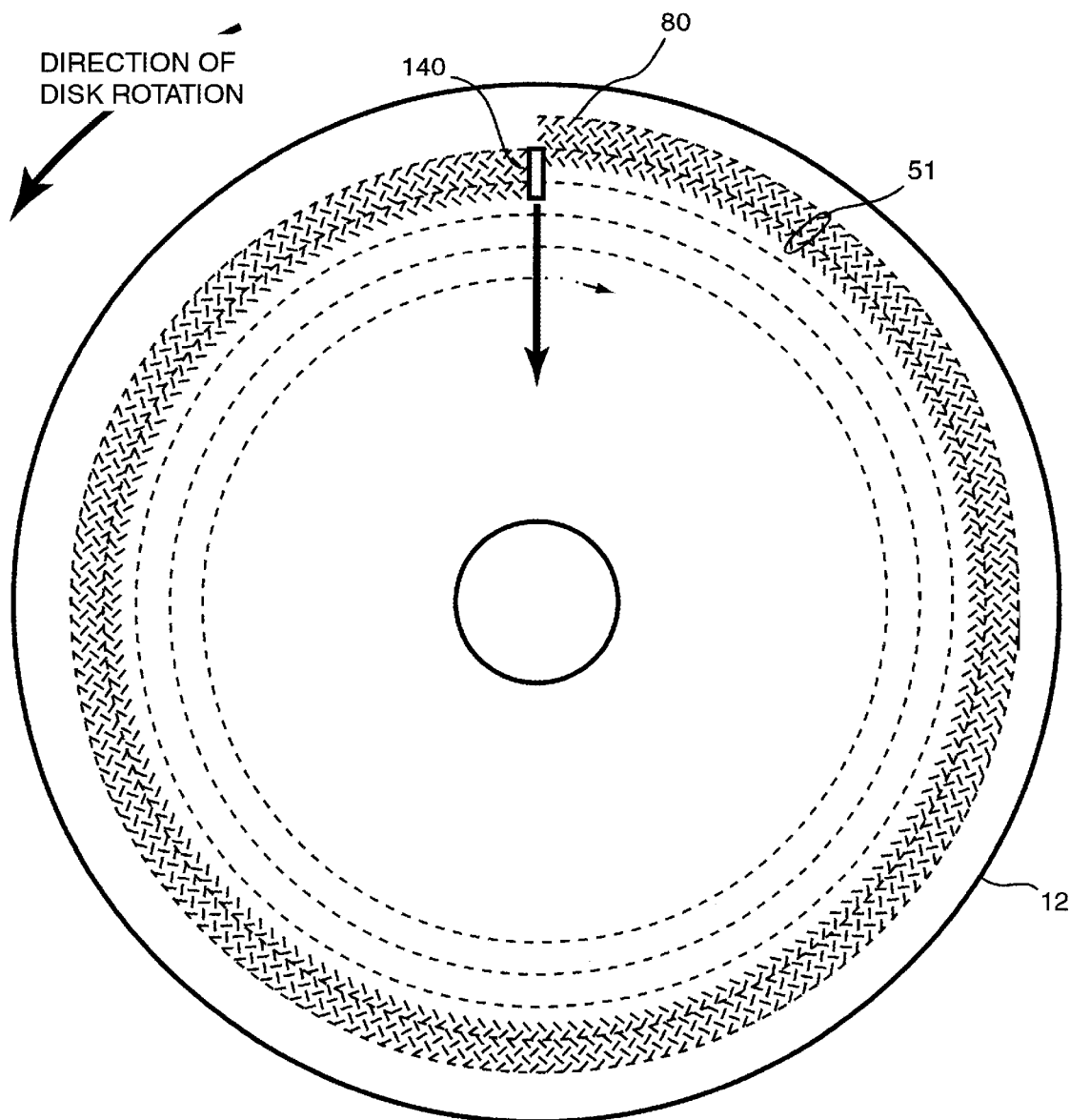
Figures 2, 5:
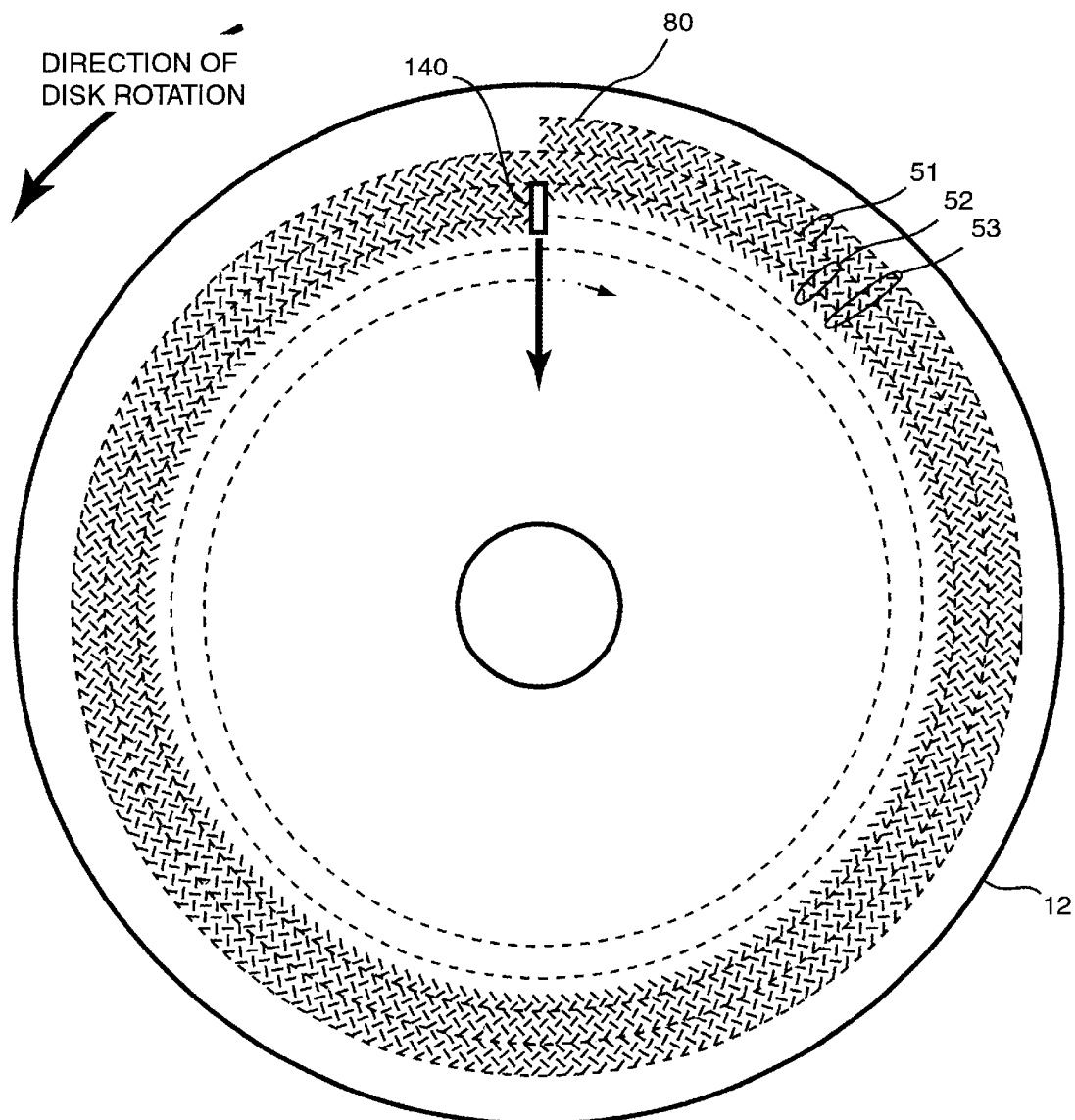

FIG. 2 shows a disk 12 with a plurality of wedge-shaped servo regions or "servo wedges" 300 that are interspersed amongst a corresponding plurality of wedge-shaped data regions or "data wedges" 400. There are normally 50 to 100 servo wedges, or even more, but the drawing shows only a few servo wedges 300 for simplicity. The drawing also exaggerates the angular extent of the servo wedges 300. If they were visible to a casual observer, they would appear to be thin, radial spokes since all of them combined would only occupy about 18 to 36 degrees of the disk's 360 degrees (i.e. about 5% to 10% of the disk's surface area).

FIG. 2 further shows that each servo wedge 300 contains a plurality of servo sectors 310. In a conventional sectored servo arrangement, as shown, annular collections or "cylinders" of servo sectors 310 define a corresponding plurality of concentric or circular servo tracks (one such servo track is cross-hatched). The disk drive's servo control system normally uses the concentric servo tracks to track follow equally concentric data tracks. It is perfectly feasible, however, to use a spiral servo track to track follow a concentric data track or a spiral data track. A spiral servo track may be especially desirable if efficiencies may be had in the servowriting process. This invention is directed to a highly efficient method of moving the write transducer along a single-helix, overlapping spiral while recording servo information within the servo wedges 300. As explained in more detail below, the single-helix recording method somewhat surprisingly produces a plurality of disjointed spiral centerline segments. The spiral centerline segments, however, are easily used to track follow a circular data track by applying an appropriate offset derived from an offset table keyed to the wedge number W# of each servo wedge 300.

Figures 3, 5:
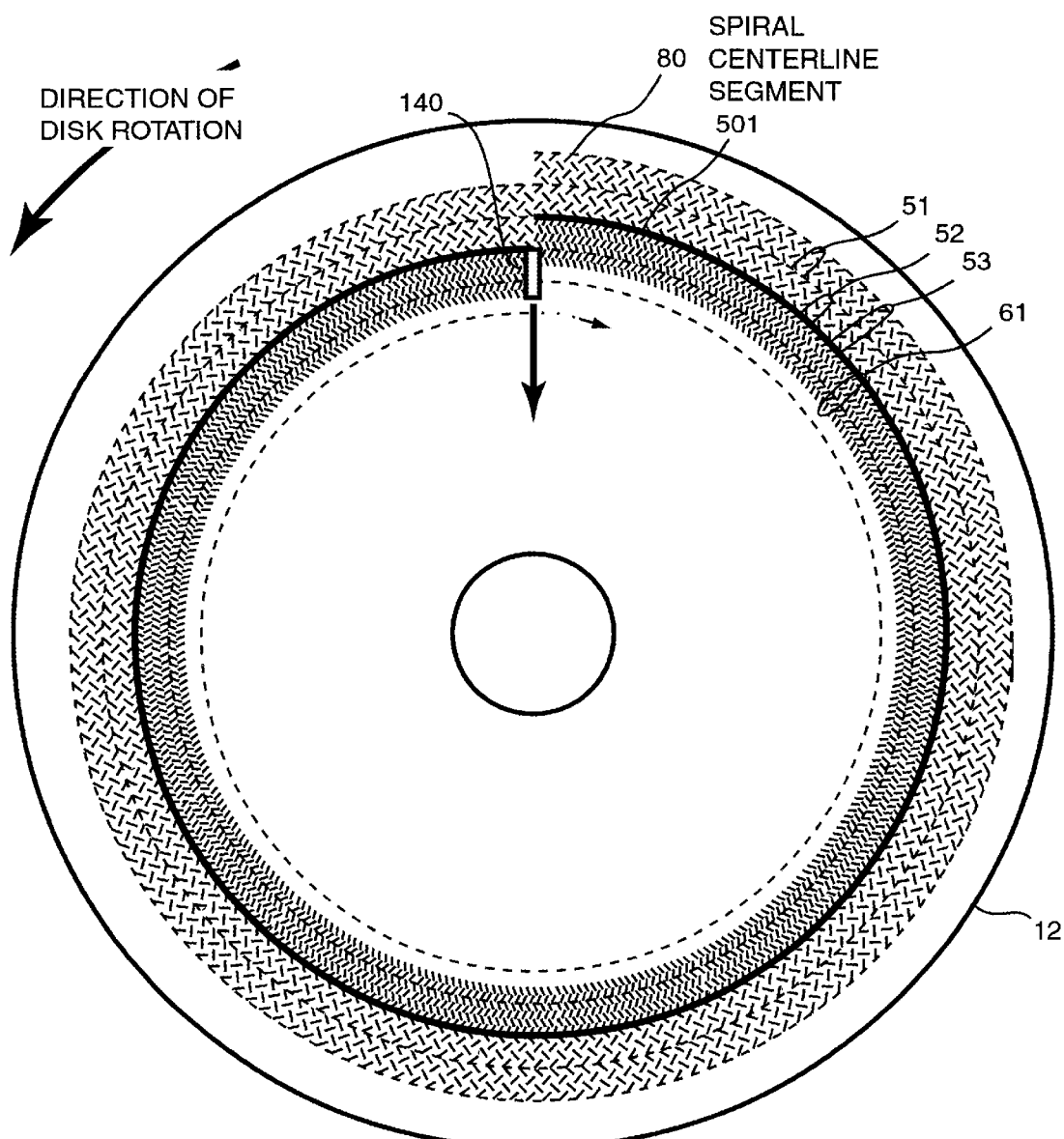
Figures 4, 5:
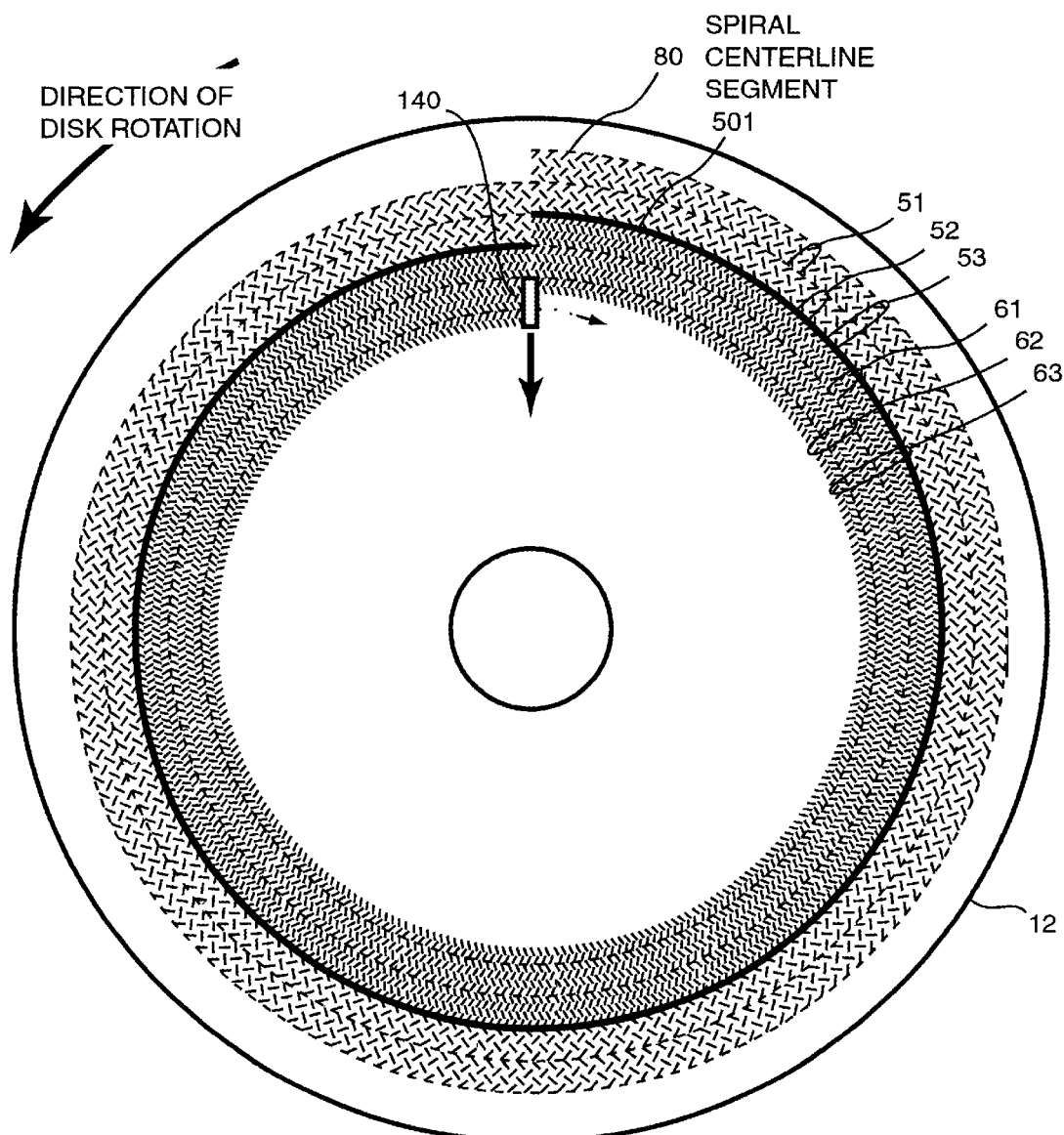
Figure 5:
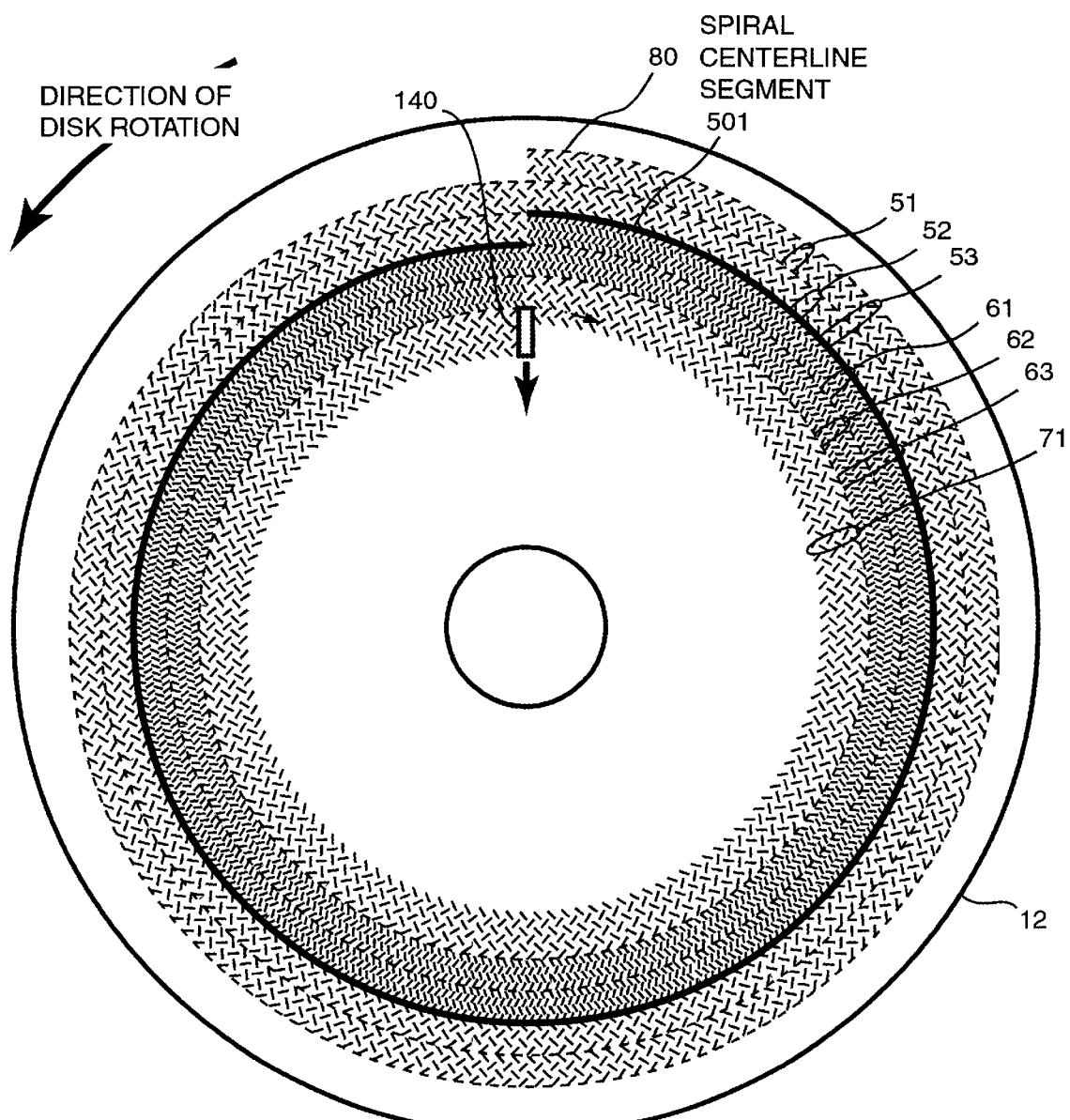

FIG. 3 shows the typical servo information fields that make up each servo sector 310 in a servo wedge 300 of FIG. 2. FIG. 3 presents the servo information that may be written in a servo sector 310 while repeatedly traversing the write transducer along concentric circles (as is conventional) or by continuously traversing the write transducer along a single helix spiral path (according to this invention). The relative dimensions of the component fields are not drawn to scale.

As shown, each servo wedge 300 contains a circumferential sequence of fields having various functions relative to locating and reading the servo information and implementing the servo control process. More particularly, each servo wedge 300 two generally comprises a header region (not separately identified) followed by a plurality of servo bursts. FIG. 3 only shows "A" and "B" bursts, but the invention may be practiced with other burst patterns such as, but not limited to, a "quadrature" pattern involving "A", "B", "C" &

"D" bursts. The header region fields include a setup or write splice field WRITE SPLICE, an address mark field AM, an automatic gain control/phase locked oscillator field AGC/PLO, a servo sync mark field SSM, a track identification field TKID, a wedge number field W#. The header region is followed by at least two servo bursts (an A burst and B burst are shown) that are circumferentially sequential and radially offset relative to a burst pair centerline.

The WRITE SPLICE field provides a buffer zone to prevent the servo control system from interpreting an erasure within a preceding user data segment as an address mark field AM. The address mark field AM provides a uniquely modulated segment so that the servo control system may detect the servo sector 300. The address mark field AM is typically created by dc erasing the segment. The AGC/PLO field provides a stable reference to set the gain of the channel and "train" a phase lock oscillator to lock on the servo channel frequency. The servo sync mark SSM field provides a unique coded word which synchronizes decoding logic in the disk drive's read channel (not shown) to either byte or word timing boundaries. The track identification field TKID provides a binary coded track address that uniquely identifies an integer servo track position for coarsely moving the head to a desired servo track ("seeking"). The TKID field conventionally uses a gray code to allow for reading track identification fields while sweeping across multiple servo tracks during seek operations. The wedge number field W# identifies the sequence number of each wedge in the sequence of wedges spaced around the track (e.g. wedge #1 to wedge #78). Lastly, the plurality of circumferentially sequential, radially offset servo bursts (e.g. A, B) provide the servo control system with information needed to determine a fractional track position for keeping the head at a desired position relative to the servo centerline ("track following").

The sectored servo information is generally recorded onto a disk 12 within discrete servo wedges 300, as shown in FIG. 3, regardless of whether such information is repeatedly recorded on concentric circles or continuously recorded along a single-helix spiral in accordance with this invention. The radial pitch of a spiral recording is difficult to illustrate if only visible within discrete servo wedges 300. Accordingly, FIGS. 4 and 5-1 to 5-5 illustrate the STW process in a continuous manner and without regard to the servo wedges so that the spiral geometry is more apparent.

Figure 4:
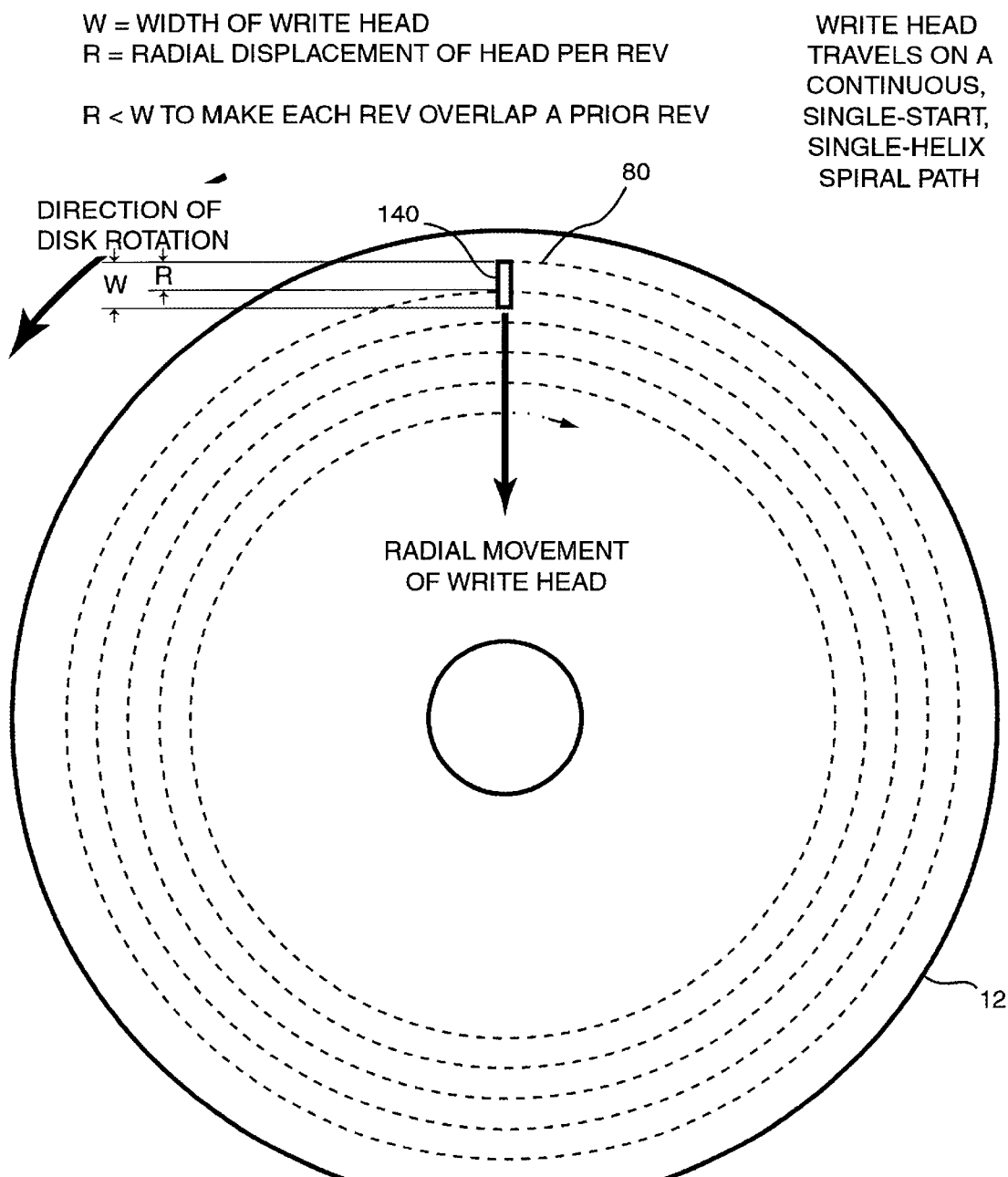
FIG. 4 is a diagrammatic view of recording servo information onto a disk along one continuous, single-helix spiral according to this invention.

FIG. 4 is a diagrammatic view of the path taken by an edge of the write transducer 140, relative to a rotating disk 12, while recording servo information onto the disk 12 along one continuous, single-helix spiral 80 according to this invention. In particular, the STW moves the write transducer 140 inward at a desired radial velocity profile that is preferably (but not necessarily) a constant radial velocity such that it traverses one radial distance R per revolution of the disk 12. The write transducer 140 itself has a pre-determined width W. It is desired, but not required, that R be less than W such that each successive stroke overlaps a prior stroke as discussed below.

An important advantage of recording all servo information while moving the write transducer 140 along one continuous, single-helix spiral 80 is that servo centerlines (discussed below) are not subject to unexpected closure error due to non-repeatable runout (NRRO) as is the case with circular servo tracks. We modify closure error with the word "unexpected" in that the servo centerlines recorded with this invention do not close. All of the servo information recorded with this invention, however, are recorded while moving the write transducer 140 along one smooth, continuous spiral path 80 such that the resulting PES is likely to be much more stable, or predictable, than with the step and settle process used to record circular servo tracks. The bottom line is that the servo information recorded with this method, in addition to being faster to record, will require less energy to track follow due to the elimination of the step and settle process. The effort required to stay "on track" based on such servo information will be reduced relative to the conventional servo pattern.

FIGS. 5-1 to 5-5 show the five spiral strokes 51, 52, 61, 62, 71 that are painted by the write transducer 140 by moving it radially inward with the STW during five successive revolutions of the disk 12. The spiral strokes 51 and 52 are "A" strokes whereas the spiral strokes 61 and 62 are "B" strokes, the pattern thereafter repeating as suggested by the spiral stroke 71 being another "A" stroke. It should be remembered that the other servo information is recorded at the same time as the "A" and "B" servo bursts, but the servo bursts provide convenient boundaries for defining "radially complete servo data sectors" and "radially partial servo data portions." In particular, with reference to the exemplary servo pattern of FIG. 3, a "radially complete servo data sector" may be regarded as extending from the midpoint of an A burst to the midpoint of an adjacent B burst. Conversely, a "radially partial servo data portion" may be regarded as a subset of such radially complete servo data sector.

FIG. 5-1 shows the position of the write transducer 140 after having traversed one complete revolution of the disk 12 (Pass #1), along with the first "A" stroke 51 that it recorded during such revolution. Because the width W of the write transducer 140 is greater than radial movement R (see FIG. 4), the "A" stroke recorded during Pass #1 extends radially beyond the path 80 that the edge of the head will take on the next pass, Pass #2.

FIG. 5-2 shows the position of the write transducer 140 after having traversed a second complete revolution of the disk 12 (Pass #2), along with the second "A" stroke 52 that it recorded during such revolution. Note that the first "A" stroke 51 of Pass #1 is overlapped by the second "A" stroke 52 of Pass #2. As a result of such overlap, 100% A bursts (not separately shown) may be stitched together where the write transducer 140 has a width W that is less than 100% of a data track pitch (e.g. 80%). The combined strokes 51, 52 initially form an extended "A" stroke 53 that is more than 100% of a data track pitch in width.

FIG. 5-3 shows the position of the write transducer 140 after having traversed a third complete revolution of the disk 12 (Pass #3), along with the first "B" stroke 61 that it recorded during such revolution. Note that the first "B" stroke overlaps the second "A" stroke 52 such that during Pass #3 the write transducer "trims" the extended "A" stroke 53 to leave behind 100% "A" bursts and to form a first spiral centerline segment #1.

FIG. 5-4 shows the position of the write transducer 140 after having traversed a fourth complete revolution of the disk 12 (Pass #4), along with the second "B" stroke 62 that it recorded during such revolution. As was the case with the "A" strokes, the first "B" stroke 61 of Pass #3 is overlapped by the second "B" stroke 62 of Pass #4 to form an extended "B" stroke 63 that is more than 100% of a data track pitch in width.

FIG. 5-5 shows the position of the write transducer 140 after having traversed a fifth complete revolution of the disk 12 (Pass #5), along with another first "A" stroke 71 that it recorded during such revolution. This "A" stroke 71 overlaps the second "B" stroke 62 such that during Pass #5 the write transducer "trims" the extended "B" stroke 63 to leave behind 100% "B" bursts and to form a second spiral centerline segment #2.

Figure 6:
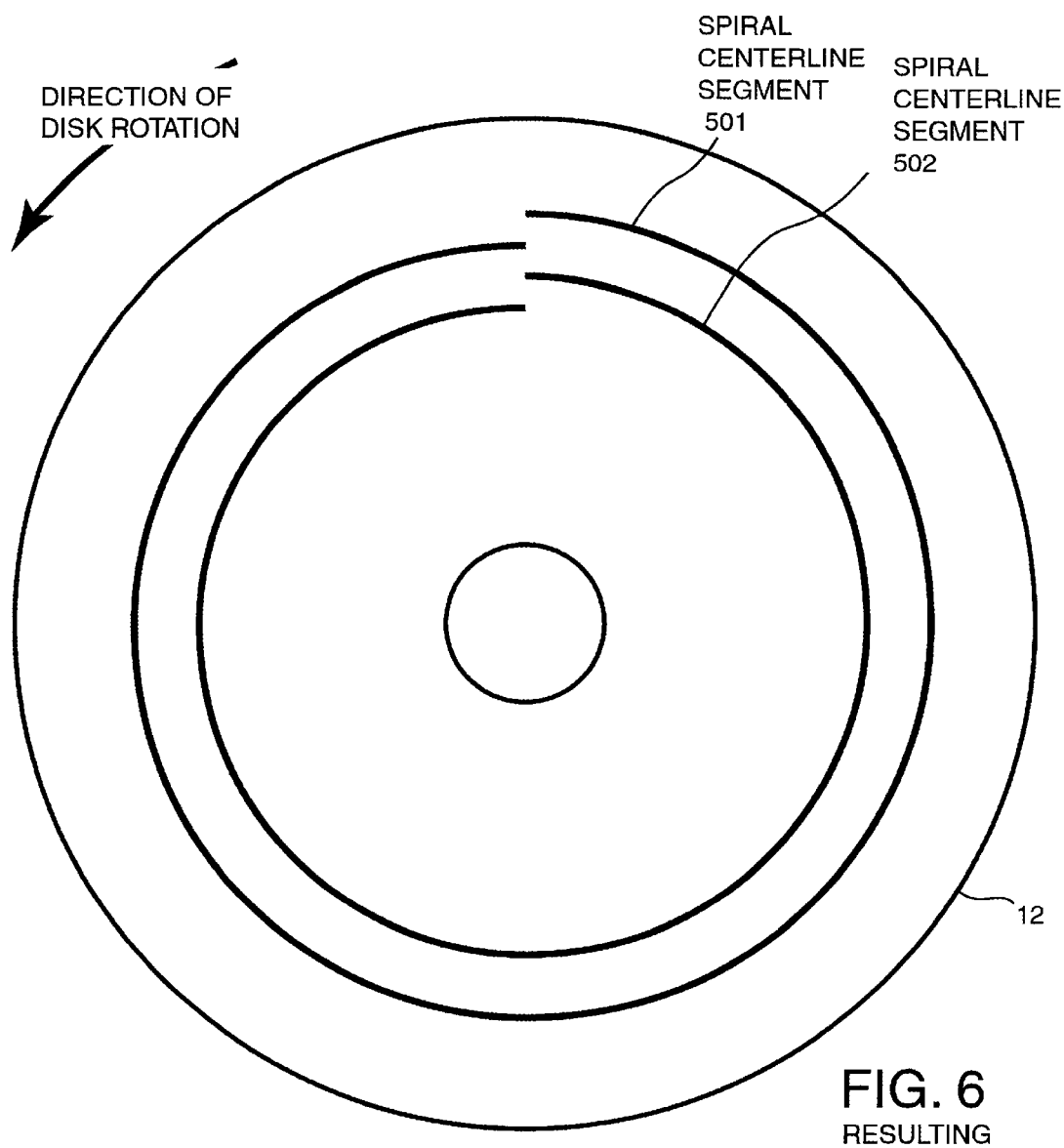
FIG. 6 shows the spiral centerline segments that are recorded onto the disk through the passes of FIGS. 5-1 to 5-5.

FIG. 6 shows the spiral centerline segments 501, 502 formed with the passes of FIGS. 5-1 to 5-5 in seclusion. Note that the spiral centerline segments 501, 502 are separate from one another, or disjointed, even though they were recorded by moving the write transducer 140 along a continuous, single-helix spiral path 80. Even though the resulting servo tracks are in the form of disjointed spiral servo segments, they may be used to follow several concentric data tracks or one long spiral data track. All that is needed is a position correction adjustment that is affected as a function of the wedge number W#.

Figure 7:
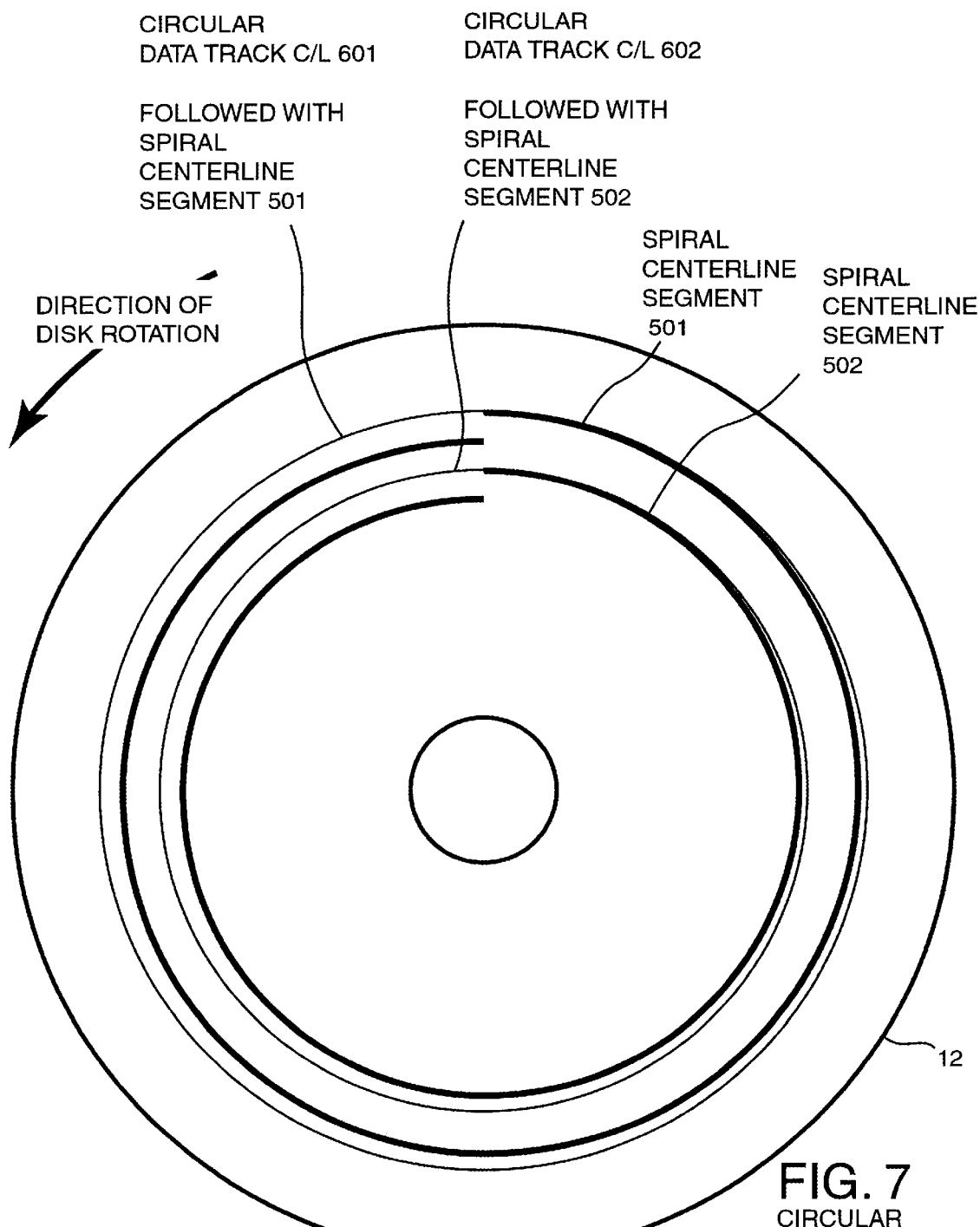
FIG. 7 shows the relationship between a plurality of concentric data tracks and the plurality of spiral centerline segments of FIG. 6.

FIG. 7 shows how the disjointed spiral centerline segments 501, 502 recorded according to this invention may be use to track follow conventional data tracks 601, 602 that are circular and concentric. Note that the circular data track (e.g. 601) is never offset from the spiral centerline segment (e.g. 501) by a predictable amount, the offset varying from 0% of a data track pitch to 50% of a data track pitch as the disk 12 revolves. We simply need to adjust the position error signal by a suitable offset value associated with the servo wedges 300 that are positioned around the disk 12 (see FIG. 3). One very direct way of providing such offset values is simply looking them up in a table as a function of the wedge number field W# associated with the particular servo wedge 300. A lookup table of this sort has already been used to provide offsets that compensate for repeatable runout (RRO).

There has been renewed interest in storing user data on a single spiral data track because disk drives now have adequate storage capabilities to make them suitable for audio-visual applications such as disk based "VCRs". A spiral data track is desirable in such context because it provides certain performance advantages in connection with reading and writing larger blocks of such multimedia data.

Figure 8:
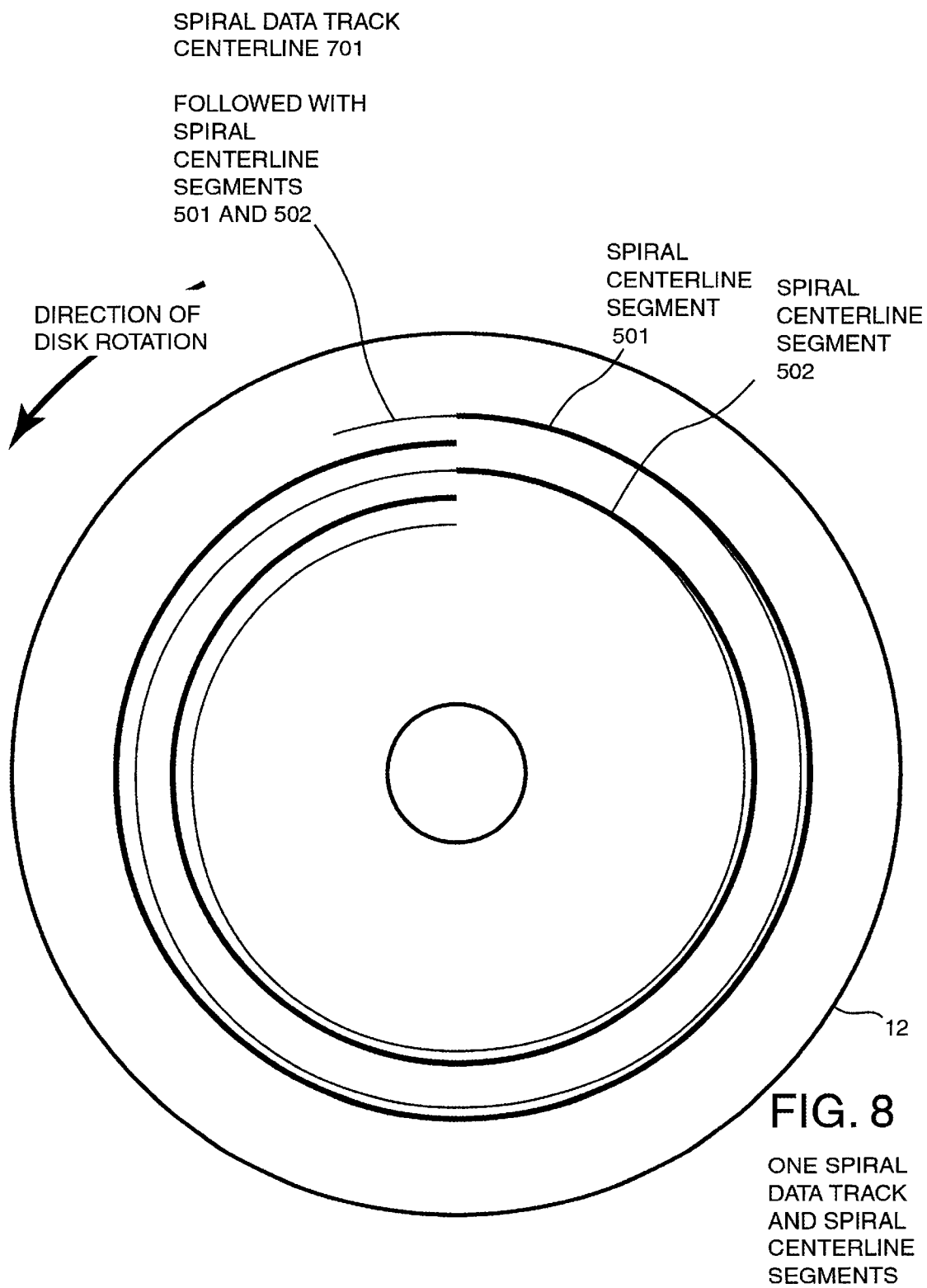
FIG. 8 shows the relationship between a single, spiral data track and the plurality of spiral centerline segments of FIG. 6.

FIG. 8 shows how the disjointed spiral centerline segments 501, 502 may be use to track follow one spiral data track 701. Note that the spiral data track 701 begins with no offset relative to one spiral centerline segment (e.g. 501) and then spirals inward to the next spiral centerline segment (e.g. 502). The spiral data track 701, therefore, will have twice the radial pitch as each of the spiral centerline segments 501, 502. The spiral centerline segments 501, 502 may be used to track follow the spiral data track 701 by providing suitable offset values in a table that is accessed as a function of the wedge number field W# associated with the particular servo wedge 300.

I claim:

1. A method of continuously recording servo information on a magnetic disk with a write transducer that is guided by a servo track writer, the method comprising the steps of:
    defining a continuous spiral path having a radial pitch that is less than a width of the write transducer;
    continuously guiding the write transducer over the magnetic disk to follow the continuous spiral path and while the write transducer is being guided along the continuous spiral path:
    recording a first plurality of radially partial servo data portions on the magnetic disk during a first complete resolution of the magnetic disk; and
    recording a second plurality of radially partial servo data portions during a second complete revolution on the magnetic disk to form at least part of a plurality of radially complete servo data sectors, wherein the second plurality of radially partial servo data portions overlap the first plurality of radially partial servo data portions.

2. The method of claim 1 wherein the steps of recording the first and second radially partial servo data portions are repeated to record a plurality of servo bursts that are a repeating portion of a servo burst pattern.

3. The method of claim 2 wherein the servo burst pattern is an AB pattern of 100% servo bursts.

4. The method of claim 2 wherein the servo burst pattern is a quadrature pattern of four servo bursts.

5. The method of claim 1 wherein the steps of recording the first and second radially partial servo data portions are repeated to record all of the servo information contained on the magnetic disk.

6. The method of claim 1 wherein the step of defining a continuous spiral path having a radial pitch that is less than a width of the write transducer is accomplished by:
    rotating the magnetic disk at a desired angular velocity profile; and
    simultaneously radially moving the write transducer at a desired radial velocity profile that moves the write transducer less than one width of the write transducer per unit of time corresponding to one revolution of the magnetic disk.

7. The method of claim 6 wherein the desired angular velocity profile is substantially constant.

8. The method of claim 6 wherein the desired radial velocity profile is substantially constant.

9. A method of continuously recording servo information within a servo sector on a magnetic disk with a write transducer that is guided by a servo track writer, the method comprising the steps of:
    moving the write transducer over the magnetic disk along one continuous, single-helix spiral stroke; and
    recording the servo information in the servo sector while the write transducer is moving along the one continuous, single-helix spiral path, wherein the step of recording the servo information in the servo sector while the write transducer is moving along on e continuous, single-helix spiral stroke comprises the substeps of:
    writing a plurality of first servo bursts within the one continuous spiral stroke during a first revolution of the magnetic disk; and
    writing a plurality of second servo bursts within the one continuous spiral stroke during a second revolution of the magnetic disk.

10. The method of claim 9 further comprising the step of trimming the plurality of first servo bursts while writing the plurality of second servo bursts during the second revolution.

11. The method of claim 9 wherein the step of recording the servo information in the servo sector while the write transducer is moving along one continuous, single-helix spiral stroke comprises the substeps of:
    writing a plurality of third servo bursts within the one continuous spiral stroke during a third revolution of the magnetic disk; and
    writing a plurality of fourth servo bursts within the one continuous spiral stroke during a fourth revolution of the magnetic disk.

12. The method of claim 11 further comprising the steps of:
    trimming the plurality of second servo bursts while writing the plurality of third servo bursts during the third revolution; and
    trimming the plurality of third servo bursts while writing the plurality of fourth servo bursts during the fourth revolution.

13. The method of claim 11 wherein the moving step comprises the substeps of:
   rotating the magnetic disk at a desired angular velocity profile; and
   simultaneously radially moving the write transducer at a desired radial velocity profile.

14. The method of claim 13 wherein the desired angular velocity profile is substantially constant.

15. The method of claim 13 wherein the desired radial velocity profile is substantially constant.

16. The method of claim 15 wherein the substep of simultaneously radially moving the write transducer at a substantially constant radial velocity causes the one continuous spiral path to radially move a predetermined percentage of a data track pitch per revolution.

17. The method of claim 15 wherein the substep of simultaneously radially moving the write transducer at a substantially constant radial velocity is implemented by moving the write transducer from one of an outer diameter and an inner diameter of the magnetic disk to the other of the inner diameter and the outer diameter of the magnetic disk.

18. A method of continuously recording servo information within a servo sector on a magnetic disk with a write transducer that is guided by a servo track writer, the method comprising the steps of:
   moving the write transducer over the magnetic disk along one continuous, single-helix spiral stroke having a radial pitch that is less than a width of the write transducer such that each revolution of the spiral stroke overlaps a portion of a prior revolution of the spiral stroke; and
   recording the servo information in the servo sector while the write transducer is moving along the one continuous, single-helix spiral path.

19. The method of claim 18 wherein the step of recording the servo information in the servo sector while the write transducer is moving along one continuous, single-helix spiral stroke comprises the substeps of:
   writing a plurality of first servo bursts by stitching together radial portions of the first servo bursts that are written within the one continuous spiral stroke during each of a first successive plurality of revolutions of the magnetic disk; and
   writing a plurality of second servo bursts by stitching together radial portions of the second servo bursts that are written within the one continuous spiral stroke during each of a second successive plurality of revolutions of the magnetic disk.

20. The method of claim 19 wherein the step of recording the servo information in the servo sector while the write transducer is moving along one continuous, single-helix spiral stroke comprises the substeps of:
   writing a plurality of third servo bursts by stitching together radial portions of the third servo bursts that are written within the one continuous spiral stroke during each of a third successive plurality of revolutions of the magnetic disk; and
   writing a plurality of fourth servo bursts by stitching together radial portions of the fourth servo bursts that are written within the one continuous spiral stroke during each of a fourth successive plurality of revolutions of the magnetic disk.

21. The method of claim 18 wherein the step of recording the servo information in the servo sector while the write transducer is moving along one continuous, single-helix s stroke comprises the substeps of:
   writing a plurality of first servo bursts within the one continuous spiral stroke during a first revolution of the magnetic disk; and
   writing a plurality of second servo bursts within the one continuous spiral stroke during a second revolution of the magnetic disk.

22. The method of claim 21 further comprising the step of trimming the plurality of first servo bursts while writing the plurality of second servo bursts during the second revolution.

23. The method of claim 21 wherein the step of recording the servo information in the servo sector while the write transducer is moving along one continuous, single-helix spiral stroke comprises the substeps of:
   writing a plurality of third servo bursts within the one continuous spiral stroke during a third revolution of the magnetic disk; and
   writing a plurality of fourth servo bursts within the one continuous spiral stroke during a fourth revolution of the magnetic disk.

24. The method of claim 23 further comprising the steps of:
   trimming the plurality of second servo bursts while writing the plurality of third servo bursts during the third revolution; and
   trimming the plurality of third servo bursts while writing the plurality of fourth servo bursts during the fourth revolution.

25. A method of using a servo track writer to move a write transducer and record servo information on a magnetic disk, the method comprising the steps of:
   rotating the magnetic disk;
   moving the write transducer in a radial direction at a constant radial velocity to traverse a spiral path relative to the rotating magnetic disk; and
   recording servo information on the magnetic disk within a spiral stroke while the write transducer is moving along the spiral path and with a stroke width substantially equal to one width of the write transducer,
   the constant radial velocity being less than one width of the write transducer per revolution of the rotating magnetic disk such that each revolution of the spiral stroke is overlapped by a subsequent revolution of the spiral stroke.

26. The method of claim 25 wherein the spiral path is one continuous, single-start, single-helix spiral path.

27. The method of claim 26 wherein the moving step comprises the steps of:
   positioning the write transducer at an outside diameter of the rotating magnetic disk; and
   moving the write transducer over the magnetic disk along the one continuous, single-start, single-helix spiral path.

28. The method of claim 27 wherein the step of recording servo information comprises recording all servo information on the magnetic disk within the one continuous, single-start spiral stroke while the write transducer is moving along the one continuous, single-start, single-helix spiral path.

* * * * *